United States Patent [19]

Buljan et al.

[11] Patent Number: 5,078,031

[45] Date of Patent: Jan. 7, 1992

[54] TITANIUM DIBORIDE-BASED COMPOSITE ARTICLES WITH IMPROVED FRACTURE TOUGHNESS

[75] Inventors: Sergej-Tomislav V. Buljan, Acton; Earl G. Geary, Jr., Lexington, both of Mass.

[73] Assignee: GTE Laboratories Incorporated, Waltham, Mass.

[21] Appl. No.: 401,258

[22] Filed: Aug. 31, 1989

Related U.S. Application Data

[62] Division of Ser. No. 158,491, Feb. 22, 1988, Pat. No. 4,889,836.

[51] Int. Cl.$^5$ .............................................. B32B 17/00
[52] U.S. Cl. ..................................... 82/1.11; 408/144; 408/1 R; 407/119; 409/131; 428/698
[58] Field of Search ..................... 82/1.11; 407/119; 408/144, 1 R; 428/698; 51/307, 295, 309; 409/131, 132

[56] References Cited

U.S. PATENT DOCUMENTS

| | | | |
|---|---|---|---|
| 3,972,161 | 8/1976 | Zoiss | 407/119 |
| 4,205,964 | 6/1980 | Hill | 407/119 |
| 4,789,277 | 12/1988 | Rhodes et al. | 82/1.11 |
| 4,863,490 | 9/1989 | Buljan et al. | 51/293 |

FOREIGN PATENT DOCUMENTS

61-270265 1/1986 Japan .

OTHER PUBLICATIONS

Murate et al., *Cer. Bull,* 46, 643–648 (1967).

*Primary Examiner*—Ellis P. Robinson
*Assistant Examiner*—Archene Turner
*Attorney, Agent, or Firm*—Frances P. Craig

[57] ABSTRACT

Composite articles, cutting tools and wear parts are prepared by densification of a mixture comprising whiskers, fibers, or particles of hard refractory transition metal carbides, nitrides or carbonitrides uniformly distributed in a titanium diboride matrix. Optionally, other dispersoids may also be incorporated. The preferred composite article or cutting tool has a fracture toughness equal to or greater than about 2.5 MN·m$^{\frac{1}{2}}$. Methods of preparation and use are also disclosed.

2 Claims, No Drawings

TITANIUM DIBORIDE-BASED COMPOSITE ARTICLES WITH IMPROVED FRACTURE TOUGHNESS

This is a divisional of copending application Ser. No. 07/158,491 filed on Feb. 22, 1988 now U.S. Pat. No. 4,889,836.

CROSS-REFERENCE TO RELATED APPLICATIONS

This application is related to commonly owned U.S. applications Ser. Nos. 07/158,493 and 07/158,492, filed concurrently herewith, and incorporated herein by reference.

FIELD OF THE INVENTION

This invention relates to fracture and abrasion resistant articles of manufacture. More particularly, it is concerned with fracture and abrasion resistant articles comprising transition metal carbide, nitride or carbonitride whiskers, fibers, or particles distributed in a matrix of titanium diboride, as well as with methods of preparation and use.

BACKGROUND OF THE INVENTION

The need for materials for cutting tool applications, exhibiting improved toughness, good strength at elevated temperatures, and chemical inertness, and capable of operating at high cutting speeds has generated a widespread interest in ceramic materials as candidates to fulfill these requirements. Conventional ceramic cutting tool materials have failed to find wide application primarily due to their low fracture toughness.

Therefore, many materials have been evaluated to improve ceramic performance, such as silicon nitride-based composites for cutting tool applications. Specific examples of silicon nitride-based composite cutting tools are discussed in U.S. Pat. No. 4,388,085 to Sarin et al. (composite silicon nitride cutting tools containing particles of TiC); U.S. Pat. No. 4,425,141 to Buljan et al. (a composite modified silicon aluminum oxynitride cutting tool containing particulate refractory metal carbides, nitrides, and carbonitrides); U.S. Pat. No. 4,433,979 to Sarin et al. (composite silicon nitride cutting tools containing particulate hard refractory transition metal carbides or nitrides); U.S. Pat. No. 4,449,989 to Sarin et al. (composite silicon nitride cutting tools coated with two or more adherent layers of refractory materials); and U.S. patent applications Ser. Nos. 892,642 and 892,634 both filed Aug. 4, 1986 by Baldoni et al. (composite silicon nitride and silicon aluminum oxynitride materials, respectively, containing refractory transition metal carbide, nitride, or carbonitride whiskers).

Many improvements have been made in the toughness, abrasion resistance, high temperature strength and chemical inertness of such materials, but increased demands by the cutting tool industry require cutting tools with new and improved characteristics. Titanium diboride has aroused interest because of its hardness, but has heretofore been considered too brittle for use in such applications as cutting tools.

In applications such as gray cast iron machining, ceramic tool wear has been found to be dominated by abrasion. Even at cutting speeds as high as 5000 sfm, chemical reactions between tool and workpiece are negligible in comparison. It has been found that abrasion resistance for, for example, silicon nitride ceramic cutting tool materials is somewhat more dependent on the fracture toughness than the hardness. It may be seen, therefore, that further improvement in the fracture toughness of ceramic materials could bring about significant increases in both reliability and abrasive wear resistance, providing materials for cutting tools with new and improved characteristics. The present invention provides such new and improved ceramic materials.

The wear-resistant titanium diboride-based composites according to the invention are also useful in wear part and structural applications, for example as seals, dies, parts for automotive engines, nozzles, etc, and in impact resistant applications, for example as ceramic armor, etc.

SUMMARY OF THE INVENTION

A densified, hard, abrasion resistant ceramic-based composite article of improved fracture toughness according to the invention includes about 5–60 volume percent of one or more first dispersoids selected from whiskers, chopped fibers, and particles of refractory carbides, nitrides, and carbonitrides of titanium, zirconium, hafnium, vanadium, niobium, tantalum, chromium, molybdenum, and tungsten, and solid solutions thereof, uniformly distributed in a matrix of titanium diboride.

A process according to the invention for preparing the densified, hard, abrasion resistant ceramic-based composite article of improved fracture toughness involves blending a mixture including about 95–40 volume percent titanium diboride powder and about 5–60 volume percent of one or more first dispersoids, to uniformly disperse the dispersoids in the titanium diboride powder. The first dispersoids are selected from whiskers, chopped fibers, and particles of refractory carbides, nitrides, and carbonitrides of titanium, zirconium, hafnium, vanadium, niobium, tantalum, chromium, molybdenum, and tungsten, and solid solutions thereof. The mixture is consolidated to a density of a least about 98% of theoretical density to form the article.

A method according to the invention for continuous or interrupted machining of steel stock involves milling, turning, or boring the stock with a shaped, densified, hard, abrasion resistant ceramic-based composite cutting tool of improved fracture toughness. The cutting tool includes a densified, hard, abrasion resistant ceramic-based composite article of improved fracture toughness including about 5–60 volume percent of one or more dispersoids, uniformly distributed in a matrix of titanium diboride. The dispersoids are selected from whiskers, chopped fibers, and particles of refractory carbides, nitrides, and carbonitrides of titanium, zirconium, hafnium, vanadium, niobium, tantalum, chromium, molybdenum, and tungsten, and solid solutions thereof. The machining speed is about 100–1500 sfm, and the feed rate is about 0.005–0.03 in/rev.

DETAILED DESCRIPTION OF THE PREFERRED EMBODIMENTS

For a better understanding of the present invention, together with other and further objects, advantages and capabilities thereof, reference is made to the following disclosure and appended claims.

Fracture toughened and abrasion resistant materials according to the present invention comprise whiskers, chopped fibers, or particles of a hard refractory transition metal carbide, nitride, or carbonitride, or mixtures or solid solutions thereof dispersed in a titanium diboride matrix. By the term "transition metal carbide, nitride, or carbonitride", as used throughout this specification and appended claims, is meant any carbide, nitride, or carbonitride of titanium, zirconium, hafnium, vanadium, niobium, tantalum, chromium, molybdenum, or tungsten. The preferred dispersoid material is TiC.

The hard refractory whiskers incorporated into materials in accordance with this invention each comprise a single crystal, while the fibers are polycrystalline. Preferably the fibers or whiskers have an average diameter of about 0.5–5 microns and an average length of about 6–250microns, with a preferred aspect ratio of length to diameter of at least 6–200. The particles to be incorporated normally are crystalline, substantially equiaxed particles of about 1 to 10 microns diameter.

Particularly advantageous composite materials may be produced by including whiskers, fibers, or particles which have been coated with a refractory material as the dispersoid in the $TiB_2$ matrix. The preparation of coated fibers and particles is known. Coated whiskers and their preparation by CVD are described in U.S. patent application Ser. No. 899,835, filed Aug. 25, 1986. The preferred coating material for the dispersoids is alumina; the preferred coating thickness is from a monolayer to about ½ of the diameter of the dispersoid. Other suitable coatings include zirconia, hafnia, yttria, or other refractory oxides with melting or decomposition points higher than 1700° C., alone or as mixtures or solid solutions with other oxides including alumina; and refractory carbides, nitrides, or carbonitrides of titanium, zirconium, hafnium, vanadium, niobium, tantalum, chromium, molybdenum, or tungsten. The coating material is different from the dispersoid material. Such coated dispersoids combine the bulk (e.g. mechanical) properties of the core material with the surface (e.g. chemical) properties of the coating.

The useful life and performance of articles in accordance with this invention depends, in large part, on the volume taken up by the dispersed phase in the article. The whiskers, fibers, or particles should comprise about 5–60% by volume of the densified composite. The preferred range of refractory whisker, fiber, or particle content is about 5–50% by volume. A more preferred range is about 5–30% by volume.

Optionally, in addition to the above-described dispersoid, the composite may include one or more other dispersed components. For example, whiskers, fibers, or particles of other materials may be included in an amount of about 5–55% by volume of the densified composite. The preferred other dispersoids are of hard refractory alumina, zirconia, hafnia, silicon nitride, tungsten carbide, or hafnium diboride; or mixtures or solid solutions of these materials. The total amount of all dispersoids, however, should not exceed about 60% and preferably is in the range of 5–40% by volume. The hard refractory dispersoids are uniformly distributed in the titanium diboride matrix.

The material of the invention may further contain additives and impurities in addition to the hereinbefore mentioned titanium diboride and dispersoids. Such further additional materials may be selected to contribute to the desirable final properties of the composite, and are preferably present in an amount less than about 5% by weight based on the total weight of the material. The starting materials should be selected to include only amounts of impurities which will not have a significant negative effect on the desired properties.

The materials described herein have a composite microstructure of refractory whiskers, fibers, and/or particulate refractory grains, uniformly dispersed in a matrix containing titanium diboride grains. For optimizing the desirable properties, particularly the strength of the composite of the present invention, it is preferable to maximize the density of the final densified composites, that is, to densities of at least about 98% of theoretical.

Articles formed from the densified composite materials described herein may be coated with one or more adherent layers of hard refractory materials, for example by known chemical vapor deposition or physical vapor deposition techniques. Typical chemical vapor deposition techniques are described in U.S. Pat. Nos. 4,406,667, 4,409,004, 4,416,670, and 4,421,525, all to Sarin et al. The hard refractory materials suitable for coating articles according to the present invention include the carbides, nitrides, and carbonitrides of titanium, zirconium, hafnium, vanadium, niobium, tantalum, chromium, molybdenum, and tungsten, and mixtures and solid solutions thereof, and alumina, zirconia, hafnia, and yttria, and mixtures and solid solutions thereof. Each layer may be the same or different from adjacent or other layers. Such coatings are especially advantageous when applied to cutting tools formed from the densified composites of the present invention.

A process for preparation of the composites described above involves consolidating or densifying, by sintering or hot pressing, the blended materials to densities approaching theoretical density, e.g. at least about 98% of theoretical, while achieving optimum levels of mechanical strength and fracture toughness at both room temperature and elevated temperature, making the composites particularly useful as cutting tools in metal removing applications.

The hard refractory whiskers, fibers, or particles with or without other dispersoids, are thoroughly dispersed in the $TiB_2$ matrix, for example by wet blending in a non-reactive medium, then drying. The mixture is then compacted to a high density by sintering or hot pressing techniques. A composition for the production of abrasion resistant materials according to the present invention may be made by employing $TiB_2$ powder, preferably of average particle size below about 3 microns.

In the initial compositions employed in the fabrication, the hard refractory transition metal carbide, nitride, or carbonitride whiskers, fibers, or particles comprise about 5–60% of the total volume of the densified article, as set out above. Optionally, as described above, other dispersoids may be admixed with these first dispersoids and $TiB_2$, up to about 55% by volume of the dry mixture. The total volume of the dispersoids in the densified composite should be limited to about 60% by volume. In the densified composite, the balance of the composite material normally comprises the matrix of titanium diboride grains, although minor amounts of other materials may be included, as described hereinbefore. The starting materials may be processed to a powder compact of adequate green strength by thoroughly mixing the particulate or powder starting materials by processes such as dry milling or ball milling in a nonreactive liquid medium, such as toluene or methanol; admixing the whisker or fiber dispersoids by high shear wet blending, preferably in a nonreactive liquid medium; and compacting the mixture, for example by pressing, injection molding, extruding, or slip casting.

Processing may also optionally include a presintering or prereacting step in which either the uncompacted material or the compact is heated at moderate temperatures.

Since the strength of articles in accordance with this invention decreases with increasing porosity in the total compact, it is important that the compact be sintered or hot pressed to a density as nearly approaching 100% of theoretical density as possible, preferably at least about 98% of theoretical density. The measure of percent of theoretical density is obtained by a weighted average of the densities of the components of the compact, and is preferably at least about 2.5 MN·m$^{3/2}$.

The following Examples are presented to enable those skilled in the art to more clearly understand and practice the present invention. These Examples should not be considered as a limitation upon the scope of the present invention but merely as being illustrative and representative thereof.

EXAMPLES

Titanium diboride-based composite bodies were made from a starting formulation of titanium diboride powder mixed with one or more dispersoids. Several different formulations were prepared as shown in the Table. In each case, the dispersoids were wet blended in a high shear blender in methanol with the matrix powder. The dispersoids/TiB$_2$ mixtures from each batch were dried at about 75° C., and pressed at about 1750° C.–1900° C. and about 5000 psi for lengths of time sufficient to obtain composite bodies of near theoretical density, about 0.5–3.0 hr. The average density as percent of theoretical (%T.D.), hardness (Hd, GN/m$^2$), and fracture toughness (IFT, MN/m$^{3/2}$) of the composite bodies for each formulation are shown in the Table. Relative fracture toughness values were obtained by an indentation fracture test utilizing a Vickers diamond pyramid indenter.

TABLE

| Ex. # | Dispersoids | | | % TD | Hd, GN/m$^2$ | IFT, NM/m$^{3/2}$ |
| --- | --- | --- | --- | --- | --- | --- |
| | v/o | Matl. | Form | | | |
| 1 | 3.7 | TiC* | P | 100 | 19.0 ± 0.5 | 2.3 ± 0.2 |
| 2 | 3.7 | TiC* | P | 100 | 18.7 ± 0.4 | 2.1 ± 0.1 |
| 3 | 3 | WC | P | 99.6 | 18.5 ± 0.3 | 2.1 ± 0.1 |
| 4 | 30 | NbC | P | 100 | 20.7 ± 0.9 | 3.2 ± 0.1 |
| 5 | 30 | Mo$_2$C | P | 100 | 18.1 ± 0.4 | 2.8 ± 0.1 |
| 6 | 20 | TaC | P | 99.8 | 18.9 ± 0.8 | 2.9 ± 0.2 |
| 7 | 27 | (W, Ti)C | P | 99.6 | 19.4 ± 0.6 | 2.4 ± 0.1 |
| 8 | 30 | TiC | P | 99.8 | 18.4 ± 0.4 | 3.5 ± 0.1 |
| 9 | 20 | HfC | P | 97.9 | 18.6 ± 0.7 | 2.8 ± 0.3 |
| 10 | 30 | TiN | P | 97.4 | 17.0 ± 0.6 | 2.7 ± 0.2 |
| 11 | 20 | TiC | W | 98.5 | 19.0 ± 0.9 | 3.3 ± 0.3 |
| 12 | 0 | — | — | 100 | 19.0 ± 0.5 | 1.5 ± 0.3 |

P = particles, W = whiskers, v/o = volume %
*minor amounts of WB$_2$ also included for grain size control.

The materials and articles according the invention can be prepared by hot pressing techniques, e.g. as described above, or by hot isostatic pressing and sintering techniques, e.g. a technique in which pressed green compacts containing titanium diboride and whiskers, fibers, or particles are sintered to a dense, polycrystalline product. The materials may be combined before hot pressing or sintering by the method described in the Examples, or by other methods known in the art.

Densified ceramic articles made in accordance with this invention are hard, tough, nonporous, abrasion resistant, and resistant to oxidation. Applications of these articles include, but are not limited to, cutting tools, mining tools, stamping and deep-drawing tools, extrusion dies, wire and tube drawing dies, nozzles, guides, bearings, wear-resistant and structural parts, and ceramic armor, and are especially useful as shaped cutting tools for continuous or interrupted milling, turning, or boring of steel stock. Such machining operations may be carried out in conventional equipment operated at a speed of about 100–1500 sfm, and at a feed rate of about 0.005–0.03 in/rev.

While there has been shown and described what are at present considered the preferred embodiments of the invention, it will be obvious to those skilled in the art that various changes and modifications can be made therein without departing from the scope of the invention as defined by the appended claims.

We claim:

1. A method for continuous or interrupted machining of steel stock comprising the step of milling, turning, or boring the stock with a shaped, densified, hard, abrasion resistant ceramic-based composite cutting tool of improved fracture toughness consisting essentially of about 5–60 volume percent of one or more dispersoids selected from the group consisting of whiskers, chopped fibers, and particles of refractory carbides, nitrides, and carbonitrides of titanium, zirconium, hafnium, vanadium, niobium, tantalum, chromium, molybdenum, and tungsten, and solid solutions thereof, uniformly distributed in a matrix of titanium diboride; wherein the machining speed is about 100–1500 sfm and the feed rate is about 0.005–0.03 in/rev.

2. A method for continuous or interrupted machining of steel stock comprising milling, turning, or boring the stock with a shaped, densified, hard, abrasion resistant ceramic-based composite cutting tool of improved fracture toughness consisting essentially of:
   about 5–60 volume percent of one or more first dispersoids selected from the group consisting of whiskers, chopped fibers, and particles of refractory carbides, nitrides, and carbonitrides of titanium, zirconium, hafnium, vanadium, niobium, tantalum, chromium, molybdenum, and tungsten, and solid solutions thereof; and
   from 0 to about 55 volume percent of one or more other dispersoids selected from the group consisting of whiskers, fibers, and particles of hard refractory hafnium diboride, tungsten diboride, silicon nitride, alumina, zirconia, and hafnia, and solid solutions thereof, the combined percent of all dispersoids not exceeding about 60 volume percent;
uniformly distributed in a matrix of titanium diboride; wherein the machining speed is about 100–1500 sfm and the feed rate is about 0.005–0.03 in/rev.

* * * * *